Sept. 29, 1964  R. R. MAZE  3,150,809
THREADING ATTACHMENT FOR GLASS SHEET
Filed Nov. 1, 1962
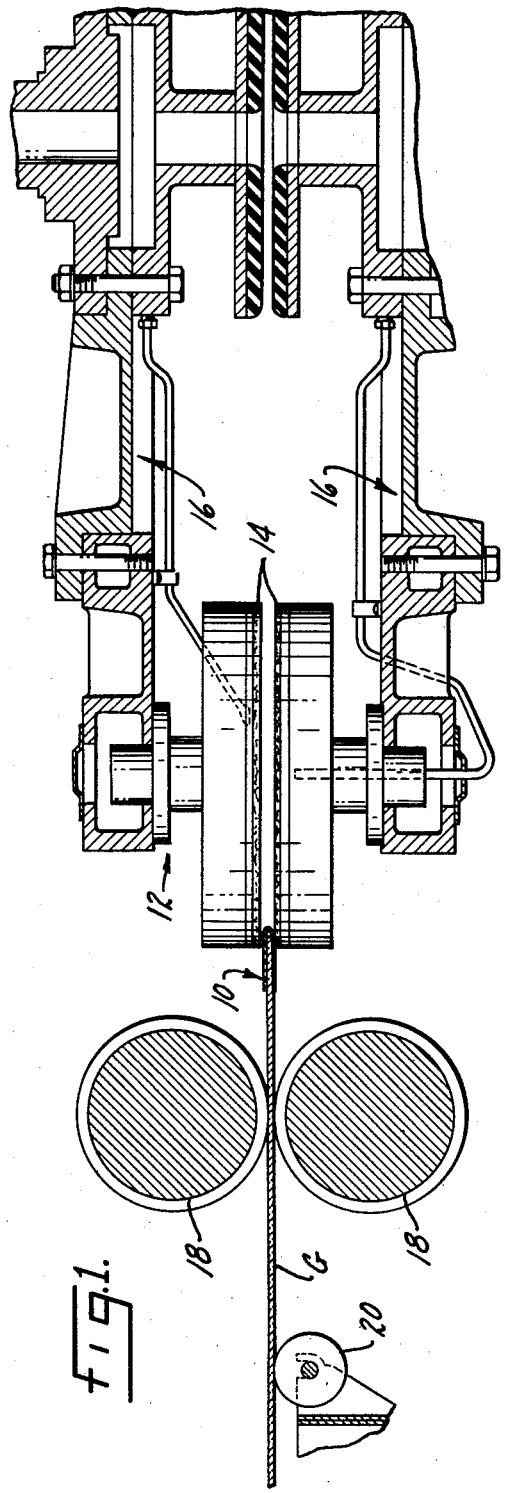
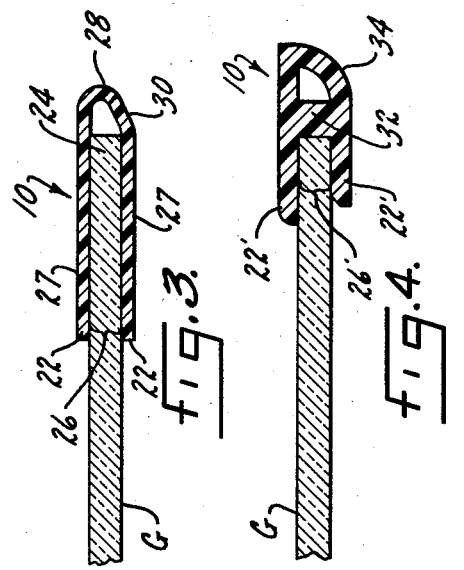
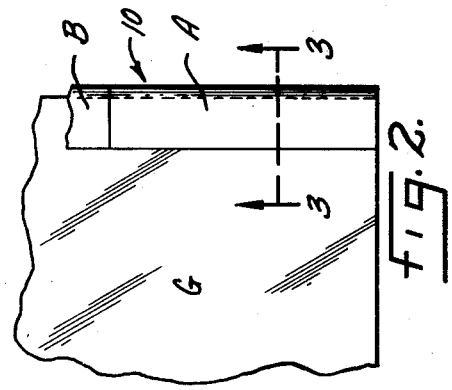
INVENTOR.
Roland R. Maze,
BY
Wolfe, Hubbard, Voit & Osann
Attorneys.

US United States Patent Office 3,150,809
Patented Sept. 29, 1964

3,150,809
THREADING ATTACHMENT FOR GLASS SHEET
Roland R. Maze, Tarentum, Pa., assignor to Pittsburgh Plate Glass Company, Pittsburgh, Pa., a corporation of Pennsylvania
Filed Nov. 1, 1962, Ser. No. 234,763
2 Claims. (Cl. 226—1)

The present invention relates to the manufacture of plate glass and, more particularly, to devices for threading glass through manufacturing line machinery.

The invention has as its principal object the provision of quick, efficient, and economical means of threading unfinished plate glass through the various stations of manufacturing line glass finishing machinery, while such machinery is maintained substantially in operating position for finishing the glass surfaces.

Another object is to provide a device for facilitating the further handling of glass ribbon which was broken while passing through surface finishing machines.

The foregoing objects and advantages, as well as numerous others, will become more apparent from the following detailed description, when read in conjunction with the appended drawings, wherein:

FIGURE 1 is a fragmentary section through polishing machinery of a glass manufacturing line and illustrating glass with a threading attachment or guard on its leading edge being threaded through such machinery on the line;

FIG. 2 is a longitudinal section of a threading attachment constructed in accordance with the invention;

FIG. 3 is a longitudinal section of a modified threading attachment; and

FIG. 4 is a plain view of a portion of a glass ribbon showing a threading attachment applied to the leading edge thereof.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

With more particular reference to the drawings, FIGURE 1 illustrates the leading edge of a glass ribbon G, with threading attachment 10 applied, being threaded through an exemplary piece of machinery 12 used to perform surface finishing operations in the manufacture of plate glass in ribbon form. The exemplary machine 12 includes means such as power driven heads for performing finishing operations on both the top and bottom surfaces of the ribbon, and is included in the drawings to illustrate the kinds of members that will be contacted and passed by the leading edge of the ribbon in the course of its being threaded along a glass manufacturing line. This particular machine 12 employs felt pads 14 which contact the glass surfaces during the finishing operations. These pads 14 are carried by massive rotating heads 16 which my be raised and lowered by power between operating and standby positions. One or more of such machines may be included at successive stations along the line. Advantageously spaced between such stations are appropriate conveyor means for maintaining the glass ribbon G which, by its nature, is flexible, in a straight, horizontal path. In order to keep the glass moving, drive rollers 18 are provided at intervals throughout the length of the glass manufacturing line and between the stations of the finishing apparatus which frictionally grip the glass and drive the same on its course. Other rollers 20 used for support purposes are also included on the production line. By such means, the glass ribbon G is supported throughout its length at closely spaced locations preventing substantial sag of the ribbon as it passes along the line.

Typically, glass ribbons vary in thickness, and, for reference, it will be convenient to indicate a glass ribbon approximately one-fourth inch thick. The width of the ribbon may be greater than six feet, and the problem of how to handle this wide, continuously moving, thin sheet material will be apparent, particularly after a break has occurred in the course of its travel through the surface finishing machinery. Moreover, considerable time is required, with resulting wastage of continuously moving unfinished ribbon glass, if, after a ribbon break, both the top and bottom polishing apparatus heads must be raised and lowered free of glass content, and then returned to operating position to permit the unbroken ribbon to proceed through the machinery and operation to resume. It is to this problem of handling the glass ribbon, and particularly to threading the same through the machinery on the line, either initially or after a ribbon break has occurred, that the present invention is directed.

In keeping with the present invention, an attachment 10 is provided wihch is adapted to be applied to the glass ribbon at its leading edge and which, when in position, presents a contour which may be threaded through rollers of the conveyor apparatus and stations of the surface finishing machinery. Various forms of leading edge threading attachments or guards are shown in FIGS. 3 and 4. In each form, the attachment 10 is constructed of material which has a smooth, slippery, outer surface so that the attachment will pass easily over elements such as finishing heads, faced with different material, without catching. Material such as aluminum or relatively hard plastic has been found satisfactory. The attachment preferably presents a thin forward edge which will easily pass between the apparatus elements on the line.

It is also preferred that the threading attachment or guard shall have sufficient flexibility so as to clamp itself to the ribbon edge. When so constructed, the attachment may be readily applied by a workman to the ribbon edge while the ribbon is moving.

An attachment 10 having these features is illustrated in FIG. 3. In keeping therewith the attachment or guard 10 is in the form of a channel member having a pair of resilient trailing lips 22 adapted to fit over and grip the leading edge 24 of the glass ribbon. Such lips define a slot 26 having a width such that the attachment or guard has a tight fit on the glass edge. The attachment positioned on the glass ribbon provides a somewhat thicker leading edge 24 than the glass ribbon itself, and is formed with upper and lower sides 27 parallel to each other and the ribbon surfaces. Such sides 27 extend beyond the edge of the glass, tapering to a relatively thin, rounded threading tip 28. In this embodiment of the invention, the underside 30 of the channel member is forwardly and upwardly inclined at an acute angle so as to more readily pass over obstructing elements in the path of the ribbon through the glass manufacturing machinery.

In another embodiment, shown in FIG. 4, the channel member is a relatively thick extrusion having glass gripping lips 22' defining a slot 26' for receiving the ribbon leading edge 24. A vertical wall 32 joining the lips 22' reinforces the channel member and enhances the clamping action of the lips on the glass edge. A channel member of aluminum or other light-weight metal, or of relatively rigid plastic material reinforced in this manner, will remain on the glass leading edge without additional means of fastening to the glass. In this form, the underside 34 of the channel member is curved upwardly to run easily over obstructions in the path of the ribbon.

Thus, in the manufacture of glass, after a shutdown of the manufacturing line, to thread a new ribbon of glass G through the successive finishing stations, the leading edge of the ribbon is provided with a straight square edge 24, by transverse glass cutting apparatus, and a threading attachment or guard 10 of the type described, is applied to the leading edge. This attachment 10 provides a smooth rounded contour which will easily pass over the members on the lower surface finishing head as the glass is threaded through the polishing equipment and conveyor apparatus.

Similarly, after a break in the ribbon, the ribbon section downstream of the break is driven through the equipment, and the machinery where the break occurred is cleared of broken glass. At a point immediately upstream of the apparatus, the ribbon is squared with glass cutting apparatus and the leading edge threading attach- 10 is applied in the manner indicated. The surface finishing heads 16 located to operate on the ribbon's under surface may be lowered slightly, as shown in FIGURE 1, to allow clearance for the attachment on the leading edge of the ribbon as it is threaded through the apparatus. It has been observed in manufacturing line operation, particularly in the case of continuous manufacture of glass in ribbon form, including means for polishing both upper and lower ribbon surfaces, that a time-lag may be expected between starting the finishing operation and operation thereof which will effectively produce high quality surface finish. This time-lag is considerably lengthened should it become necessary to move the operating equipment into standby position while the ribbon is rethreaded after a break. One of the features of the present invention is that the maunfacturing line surface finishing apparatus may be maintained substantially in operating position after a ribbon break and while the ribbon is being rethreaded so that the time-lag in resuming operation is held to a minimum, thus reducing glass wastage.

As a means for facilitating mounting the threading attachment 10 in place on the ribbon's leading edge, it has been found preferable to form an attachment in two half-ribbon width pieces A, B, each piece extending to the center of the ribbon from one lateral edge. Workmen find separate pieces easier to apply to the ribbon leading edge without stressing the glass. When dealing with a narrower ribbon, a threading attachment extending the full width of the ribbon has been used with satisfactory results.

I claim as my invention:

1. The method of threading a solid ribbon of glass into a glass surfacing apparatus comprising the steps of making a clean break at the leading edge of said ribbon so as to present a relatively even transverse leading edge of said ribbon, applying an attachment having a smoothly rounded longitudinal edge only to the leading edge of said ribbon so that said longitudinal attachment edge precedes the ribbon into said apparatus, and thereafter threading the ribbon with attachment on the leading edge thereof into the glass surfacing apparatus.

2. In combination with a solid sheet of plate glass having parallel lateral edges and a leading edge transverse thereto, a channel member fitted only on said leading edge of the glass and presenting a rounded leading edge ahead of said glass leading edge for facilitating the threading of said sheet into glass manufacturing machinery.

References Cited in the file of this patent
UNITED STATES PATENTS

| | | |
|---|---|---|
| 2,277,319 | Greenberger | Mar. 24, 1942 |
| 2,812,937 | Robinson | Nov. 12, 1957 |
| 3,085,346 | Allander et al. | Apr. 16, 1963 |